United States Patent
Franz et al.

(10) Patent No.: US 8,306,194 B2
(45) Date of Patent: Nov. 6, 2012

(54) METHOD FOR REDUCING COSTS DURING THE TRANSFER OF UNIDIRECTIONAL INFORMATION FLOWS

(75) Inventors: Mathias Franz, Falkensee (DE); Detlev Freund, Berlin (DE); Norbert Löbig, Darmstadt (DE); Johannes Schöpf, Fürstenfeldbruck (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1957 days.

(21) Appl. No.: 10/577,319

(22) PCT Filed: Oct. 22, 2004

(86) PCT No.: PCT/EP2004/052630
§ 371 (c)(1),
(2), (4) Date: Apr. 28, 2006

(87) PCT Pub. No.: WO2005/043813
PCT Pub. Date: May 12, 2005

(65) Prior Publication Data
US 2007/0081524 A1 Apr. 12, 2007

(30) Foreign Application Priority Data
Oct. 29, 2003 (GB) .................................. 103 50 353

(51) Int. Cl.
*H04M 1/64* (2006.01)
(52) U.S. Cl. ........... 379/88.08; 379/112.05; 379/114.01; 379/221.07
(58) Field of Classification Search ................ 379/88.18
See application file for complete search history.

(56) References Cited

U.S. PATENT DOCUMENTS

| | | | | |
|---|---|---|---|---|
| 4,975,828 A | * | 12/1990 | Wishneusky et al. | 710/11 |
| 5,276,681 A | * | 1/1994 | Tobagi et al. | 370/229 |
| 5,457,687 A | * | 10/1995 | Newman | 370/232 |
| 5,706,279 A | * | 1/1998 | Teraslinna | 370/232 |
| 5,793,843 A | * | 8/1998 | Morris | 455/422.1 |

(Continued)

FOREIGN PATENT DOCUMENTS
EP    1 096 770 A2    5/2001
(Continued)

OTHER PUBLICATIONS

Ismail Dalgic and Hanlin Fang, "Comparison of H.323 and SIP for IP Telephony Signaling", Proceedings of the SPIE Conference on Multimedia Systems and Applications II, Sep. 1999, pp. 106-122, vol. 3845, XP000949839, Boston, Massachusetts, US.

(Continued)

*Primary Examiner* — Simon Sing
(74) *Attorney, Agent, or Firm* — Laurence A. Greenberg; Werner H. Stemer; Ralph E. Locher

(57) ABSTRACT

During the output of data and distribution services, user data streams frequently transferred to a corresponding communication device (i.e. information output system and/or the distribution system) are possibly irrelevant to the server. Despite this, resources for the processing of incoming useful data flows inside the communication device are provided in many cases on account of compatibility grounds. As a result, energy is reduced in the communication device. According to the invention, in order to reduce the efforts involved in processing useful data transferred in the direction of the communication device, at least one part of useful data is discarded prior to the implementation of working steps provided for the processing of useful data.

18 Claims, 1 Drawing Sheet

U.S. PATENT DOCUMENTS

| | | | |
|---|---|---|---|
| 5,862,208 A * | 1/1999 | MeLampy et al. | 379/212.01 |
| 5,953,338 A * | 9/1999 | Ma et al. | 370/395.21 |
| 6,229,789 B1 * | 5/2001 | Simpson et al. | 370/235 |
| 6,366,651 B1 * | 4/2002 | Griffith et al. | 379/88.14 |
| 6,405,033 B1 * | 6/2002 | Kennedy et al. | 455/414.1 |
| 6,426,944 B1 * | 7/2002 | Moore | 370/236 |
| 6,445,682 B1 * | 9/2002 | Weitz | 370/257 |
| 7,257,641 B1 * | 8/2007 | VanBuskirk et al. | 709/238 |
| 7,499,446 B1 * | 3/2009 | Gou et al. | 370/389 |
| 7,499,466 B2 * | 3/2009 | Hundscheidt et al. | 370/432 |
| 7,529,250 B2 * | 5/2009 | Pedersen | 370/395.21 |
| 7,822,018 B2 * | 10/2010 | Williams et al. | 370/352 |
| 8,149,720 B2 * | 4/2012 | Teng | 370/241 |
| 2006/0168336 A1 * | 7/2006 | Koyanagi et al. | 709/240 |
| 2007/0053303 A1 * | 3/2007 | Kryuchkov | 370/250 |
| 2007/0081524 A1 * | 4/2007 | Franz et al. | 370/356 |
| 2010/0180315 A1 * | 7/2010 | Nakamichi et al. | 725/116 |

FOREIGN PATENT DOCUMENTS

EP    1096770 A2 *   5/2001

OTHER PUBLICATIONS

Henning Schulzrinne and Jonathan Rosenberg, "Signaling for Internet Telephony", Network Protocols, Conference on Austin, TX, USA, Oct. 13-16, 1998, pp. 298-307, IEEE Comput. Soc., , XP010309377, Los Alamitos, CA.

* cited by examiner

METHOD FOR REDUCING COSTS DURING THE TRANSFER OF UNIDIRECTIONAL INFORMATION FLOWS

CROSS REFERENCE TO RELATED APPLICATIONS

This application is the U.S. National Stage of International Application No. PCT/EP2004/052630, filed Oct. 22, 2004 and claims the benefit thereof. The International Application claims the benefits of German application No. 10350353.6 DE filed Oct. 29, 2003, both of the applications are incorporated by reference herein in their entirety.

FIELD OF INVENTION

The invention relates to a method for reducing costs of processing useful data transferred in the direction of a communication device in cases in which a bidirectional connection between the communication device and a communication partner entity is set up within the framework of a service, although the service does not require transmission of useful data to the communication device.

The invention lies in the area of voice and data communication and in particular touches on aspects of switching technology.

BACKGROUND OF THE INVENTION

In communication technology there is constant striving for resource efficiency. In such cases making savings in communication devices for switching and distribution of useful data has an important role to play. When reducing the costs and the complexity of these types of devices however it should be considered that standards have to be complied with and the compatibility to other communication devices is to be preserved. These requirements frequently get in the way of reducing the means or resources used.

SUMMARY OF INVENTION

An important example for communication devices with a potential for savings are devices of which the functionality does not demand any processing of incoming useful data. Examples of these types of communication devices are as follows:

Pure information output systems, e.g. pure voice response systems. For information output systems which only provide for the output of information (e.g. voice information) and may possibly not be able to be controlled by information fed in from outside (such as systems for interactive voice response) the resources for processing of information transferred to the system can be reduced.

Pure distribution systems. Distribution systems are frequently restricted to the forwarding of or onwards transfer of information or useful data. Resources for the interpretation or processing of useful data can be provided to a reduced extent.

The saving measures described above are restricted by the fact that there must be compatibility in communication with other devices or terminals. Thus there are communication entities (e.g. terminals, switching devices or gateways), for which bidirectional communication is provided within the framework of a communication process regardless of whether useful data is actually being sent to the communication partner entity. For connections for useful data transmission to this type of communication entity resources must be provided by information output systems or communication distribution systems for processing the information transferred by the communication partner entity, in order to make possible a bidirectional connection.

An example for this type of scenario is the exchange of information between a pure voice response system and a terminal in which only a bidirectional connection is supported by the terminal. Although relevant information is only transferred in one direction (from the voice response system to the terminal) a transmission of useful data in the other direction also arises, which consists for example of the transmission of background noises picked up by a microphone of the terminal. The useful data flow or bearer flow transmitted from the terminal to the voice response system is then irrelevant for the service but demands processing resources on the voice response system side.

In addition the protocols used for a bidirectional connection frequently provide for information to be sent in both directions which contains statistical data about the quality of the connection. This information is used for example to regulate the transmission rate. A communication device involved must thus have the means to generate this information.

An important protocol in which the situation described above can occur is the RTP (real time protocol) which is used in connection with the RTCP (real time control protocol). The RTP protocol makes it possible to transmit voice as useful data or bearer. The transmission of the bearer is controlled by the RTCP protocol. If for example a voice response system outputs voice information by means of the RTP/RTCP protocol stack to a terminal which only supports bidirectional RTP connections, statistical information about the connection is transferred in both directions by means of the RTCP protocol.

An object of the invention is to make possible a reduction in costs for communication devices.

The object is achieved by the objects of the independent claims.

The invention is based on the observation that for communication devices which in general or for specific services do not provide for transmission of useful data to a communication partner entity, in cases in which despite this a bidirectional connection to the partner entity is set up, for example because the communication partner entity only supports bidirectional connections with the protocol used, the cost of processing of the useful data transferred by the communication partner entity can be reduced by discarding at least a part of this useful data transmitted by the communication partner entity in the direction of the communication device.

Examples of devices or services for which as a rule useful data transmission is only provided in one direction, i.e. unidirectionally, are information output systems (e.g. voice response systems) and distribution systems or information output services (e.g. voice response services) and distribution services. The communication partner entity can for example take the form of a terminal or a gateway.

The invention has the advantage of greater resource efficiency compared to conventional systems. The cost of processing is reduced by transmitted useful data which is irrelevant for the service being discarded. An irrelevant background noise which may possibly be transmitted for a voice connection is not completely evaluated in the communication device. Savings can be made in some of the hardware or software resources which are conventionally provided in the communication device for processing of useful data transmitted to the communication device This can involve expensive special hardware such as DSPs (DSP: digital signalling processor) or ASICs (ASIC: application specific integrated circuit).

The invention can for example be used in packet-oriented networks over which useful data is transmitted as useful data packets in the direction of the communication device. In this case the discarding of the packets can be implemented for example in the following two ways:

A router upstream from the communication device discards the useful data transmitted to the communication device.

Incoming data packets are filtered in the communication device, e.g. on the basis of the UDP port addresses (UDP: user datagram protocol), and useful data packets which were sent by the communication partner entity are discarded. This filtering out of the useful data not relevant for the service can be undertaken on the lower layers of the protocol stack. Processing on the upper layers of the communication protocol or an evaluation or interpretation of transferred useful data is not required, so that no resources have to be provided for this.

The useful data packets are transmitted for example in the case of real-time traffic by means of the RTP protocol. The RTCP protocol is used for the control of RTP connections. In accordance with the RTCP protocol statistical information is transmitted between the communication entities which frequently relates to the transmission quality of the useful data transmission of the communication entities. Conventionally the generation of such statistical information or in general of control information on connection quality requires the transferred useful data to be evaluated. The present invention however provides for part of the useful data to be discarded in the cases discussed, that is not evaluated in relation to transmission quality. In accordance with an advantageous development the control partner entity can be prevented, on account of missing or misleading messages or information about the connection established to a communication device, from initiating undesired reactions—in the extreme case the ending of the bidirectional connection. In this case the communication device sends information or messages to the communication partner entity which simulate a correct functioning of the useful data transmission from the control partner entity to a communication device. In this case for example a known range of values for the control information can be used which corresponds to a trouble-free useful data transmission. Furthermore it is possible for a small part of the useful data not to be discarded but to be evaluated for the calculation of statistical information or control information and for the results obtained to be extrapolated for the entire volume of useful data.

BRIEF DESCRIPTION OF THE DRAWINGS

The invention is explained in greater detail below within the context of an exemplary embodiment with reference to Figures. The Figures show.

DETAILED DESCRIPTION OF INVENTION

Figure 1:
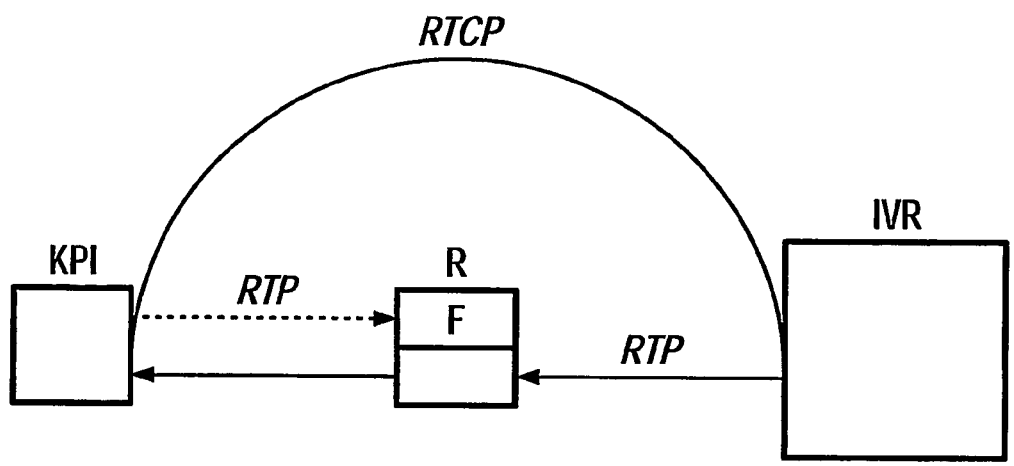
FIG. 1: a communication device and a communication partner entity which communicate with one another, with useful data transmitted from a communication partner entity to the communication device being filtered out by a router.
Figure 2:
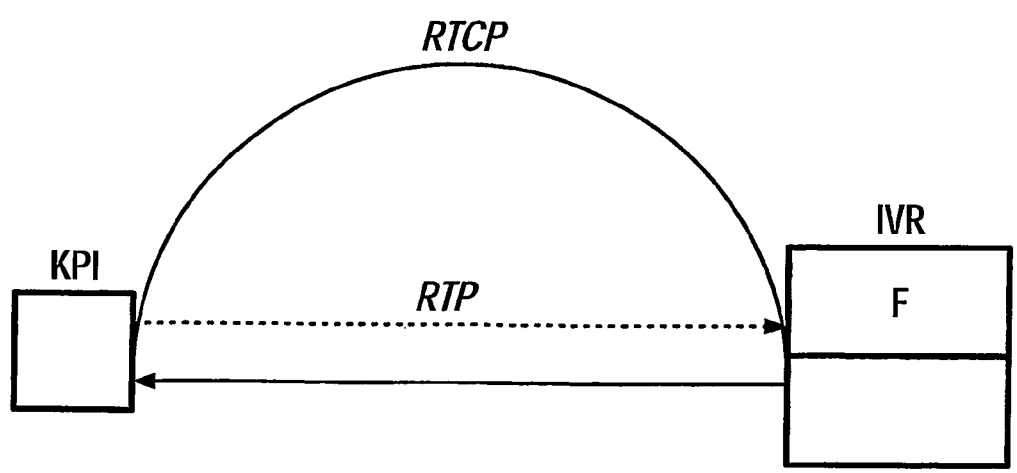
FIG. 2: a communication device and a communication partner entity in a communication relationship, with the useful data sent from the communication partner entity to the communication device being filtered out in the communication device and discarded.

Both Figures show a communication device IVR (IVR: Interactive Voice Response) and a communication partner entity KPI which exchange useful data with each other via a bidirectional connection by means of the RTP protocol. These connections are controlled or checked by means of the RTCP protocol. A router R is shown in FIG. 1 which filters out with the aid of a filter F useful data transmitted to the communication device IVR, so that this data does not reach the communication device IVR. In FIG. 2 this filter function is undertaken by the communication device IVR itself which filters out useful data transmitted from the communication partner entity KPI with the aid of a filter F and discards it, so that said data does not have to be processed by higher protocol layers.

The communication device IVR is for example a software-based VoIP (VoIP: Voice over IP) voice response system based on the RTP and the RTCP protocol.

An example is described below for a voice response system showing how it is possible to work with unidirectional channels instead of with bidirectionally operated RTP/RTCP channels.

In the first example corresponding to FIG. 1 an upstream router discards the RTP packets in the direction of the voice response system, so that despite bidirectional through connection, no RTP load is imposed on the voice response system.

In the case in which the useful data is handled in the voice response system (example corresponding to FIG. 2) the Call Controller controlling the call or the remote end point switches a symmetrical RTP flow through the IP network to the voice response system. A static filter is created above the IP stack, i.e. the IP protocol stack in the voice response system, which detects and discards all IP packets leading to the voice response system transmitted by means of the RTP protocol on the basis of the UDP (user datagram protocol) ports used by these protocols. The higher protocol layers which would have had to execute the tasks for these packets requiring more computing time therefore no longer have any load imposed on them and only have to handle outgoing data flows.

Since in a software-based voice response system a very high proportion of the performance is expended in handling RTP protocol sequences, the freed-up computing time budget can now be used for example for handling further voice response ports.

RTCP sender reports are sent out in the way provided for in RFC 1889 (RFC: request for comments). The standard already provides for these to be sent out relatively infrequently so that no major outlay in computing time is required. Thus the filter can forward RTCP packets to the RTCP protocol stack of the voice response system.

In accordance with a development of the subject of the application the correct functioning of a bidirectional connection can be simulated at the level of the RTCP protocol. The RTCP protocol provides for the optional sending out of what are known as Receiver Reports from the voice response system to the remote user. Since in the exemplary embodiment a bearer or useful data flow is physically switched by the IP network, an attempt can be made to evaluate the voice flows or Voice Activity messages picked up by the remote microphone and transmitted via the communication partner entity to simulate to the remote user or to its bearer treatment a duplex dream, i.e. a bidirectional connection.

So that the aim of reducing costs which is achieved by an exemplary embodiment is not counteracted, it makes sense to dispense with continuous calculation of the RTCP statistics based on all received RTP packets. The following approaches to solutions for reducing the effort of calculating the RTCP statistics can be adopted:

a) Sending out a default Reception Report

Since a voice response or distribution system described here is not dependent on the quality of the flow received, experience shows that acceptable default values can be entered in the report. If a network operator is to evaluate or interpret these, he must be aware of the fact that specifically these reports are not meaningful merely within the framework of the definition of the default values. This ensures that the remote bearer treatment does not initiate any undesired counter-measures (e.g. reduces the send rate or generates error reports). The Reception Report can contain the following parameters (in accordance with RFC 1889):

SSRC (Synchronization source) of the sending source (can be determined from any received RTP packets, e.g. by means of an RTP sniffer or filter, which at least evaluates a number of packets at the beginning of the call/the session or is determined from the last received emitter report)

Lost Fraction: 256 is entered here, which corresponds to an ideal reception.

Cumulated number of lost packages: 0 or a very low value is entered here.

Highest received sequence number: The number of Sequence Number Cycles and the Highest Sequence Number Received is determined from a rounding of an algorithmic calculation from the time since the last Reception Report (alternately the beginning of the bearer through-connection can be used as a basis)

the Codec Type and its bandwidth and the packetization sizes used (results of the Codec Negotiation)

by means of the RTP packet number to be expected. These parameters are stable for voice response systems for each call/session and therefore this type of calculation/sequence of divisions is possible.

Interarrival Jitter: a non-suspect value which corresponds to 1 ms is entered here.

Last (arrived) SR: The time stamp of the last send report is transferred from the RTCP statistics function for Sender Reports.

Delay since last (arrived) SR: The delay entered in the last send report is transferred from the RTCP statistics function for Sender Reports.

b) Reduction of the number of RTP packets which have to be processed by the RTCP statistics function.

Checked via a suitable time-controlled dynamic filter above the IP stack (which is sensitive to RTP port addresses), the RTCP statistics function is only presented with RTP packets over a restricted period of time (e.g. the duration of a voice response call), e.g. over a number of equally-distributed 100 ms intervals of the voice response call which lasts an average of 10 seconds. The RTCP ports are in principle open here.

Essentially commercial RTCP statistics can be reused here which feign a longer measurement than has actually taken place. The parameter "Highest Received Sequence Number" must however be approximated as under a). For the "Interarrival Jitter and Lost Fraction" parameters on the other hand the values generated from the 100 ms measurement can be entered as the "real" measured values in the Reception Report. The parameter "Cumulated number of lost packages" must also be extrapolated.

If for example intervals lasting 1 second are used as the basis for sending out the Reception Reports and only 100 ms is measured in them in each case, the value to be sent would have to be multiplied by a factor of 10. An equal distribution of packet losses over the duration of the call is assumed here.

The invention claimed is:

1. A method for reducing a cost of processing user data transmitted in the direction of a communication device, wherein a bidirectional connection between the communication device and a communication partner entity is established for a service, and wherein the service does not require the user data transmission to the communication device, the method comprising:

transmitting user data from the communication partner to the communication device;

discarding at least part of the user data;

transmitting information from the communication device to the communication partner entity indicating a trouble-free transmission of the user data from the communication partner entity to the communication device, the information relating to a transmission quality of the user data transmitted from the communication partner entity to the communication device;

wherein the user data is transmitted as a user data packet over a packet-oriented network in the direction of the communication device;

wherein at least a part of a plurality of user data packets arriving at the communication device from the communication partner are filtered;

wherein the filtered data packets are discarded; and wherein the filtering is based on a port address.

2. The method according to claim 1, wherein the communication device is an information output system or a distribution system.

3. The method according to claim 1, wherein the communication partner entity is a terminal or a gateway.

4. The method according to claim 1, wherein a router upstream from the communication device discards the at least part of the user data.

5. The method according to claim 1, wherein the user data packet is transmitted in accordance to a real time protocol (RTP).

6. The method according to claim 1, wherein the information is transmitted in accordance to a real time control protocol (RTCP).

7. The method according to claim 1, wherein RTP packets are discarded.

8. A communication system having a connection between a communication partner entity and a communication device, comprising:

a filter for identifying user data transmitted from the communication partner entity to the communication device;

a simulation information transmitted to the partner entity to simulate a trouble-free transmission of the user data from the communication partner entity, said simulation information relating to a transmission quality of the user data transmitted from the communication partner entity to the communication device;

wherein a plurality of data packets arriving at the communication device are filtered;

wherein the filtered data packets are discarded; and wherein the filtering is based on a port address.

9. The communication system according to claim 8, wherein the user data is transmitted as a user data packet over a packet-oriented network in the direction of the communication device.

10. The communication system according to claim 9, wherein the information is transmitted in accordance to a real time control protocol (RTCP).

11. The communication system according to claim 8, wherein a router upstream from the communication device discards the at least part of the user data.

12. The communication system according to claim 8, wherein the user data packet is transmitted in accordance a real time protocol (RTP).

13. The communication system according to claim 8, wherein RTP packets are discarded.

14. A router in a connection path for a connection between a communication partner entity and a communication device, comprising:
- a filter for discarding at least part of user data transmitted from the communication partner entity to the communication device;
- a simulation information transmitted to the partner entity to simulate a trouble-free transmission of the user data from the communication partner entity, said simulation information relating to a transmission quality of the user data transmitted from the communication partner entity to the communication device;
- wherein user data is transmitted as user data packets over a packet-oriented network in the direction of the communication device;
- wherein the user data packets arriving at the communication device are filtered;
- wherein filtered user data packets are discarded; and
- wherein the filtering is based on a port address.

15. The router according to claim 14,
- wherein user data is transmitted as user data packets over a packet-oriented network in the direction of the communication device, and
- wherein the user data packets are transmitted in accordance to a real time protocol (RTP).

16. The router according to claim 14, wherein user data is transmitted as user data packets over a packet-oriented network in the direction of the communication device.

17. The router according to claim 16, wherein the information is transmitted in accordance to a real time control protocol (RTCP).

18. The router according to claim 14, wherein RTP packets are discarded.

* * * * *